United States Patent [19]
Akagi

[11] Patent Number: 5,252,409
[45] Date of Patent: Oct. 12, 1993

[54] FUEL CELL

[75] Inventor: Kosuke Akagi, Ikoma, Japan

[73] Assignee: Osaka Gas Co., Ltd., Osaka, Japan

[21] Appl. No.: 841,837

[22] Filed: Feb. 26, 1992

[30] Foreign Application Priority Data

Mar. 1, 1991 [JP] Japan .................... 3-035786

[51] Int. Cl.$^5$ .................... H01M 8/04; H01M 8/12
[52] U.S. Cl. .................... 429/32; 429/39
[58] Field of Search .................... 429/32, 38, 39

[56] References Cited

U.S. PATENT DOCUMENTS

| | | | |
|---|---|---|---|
| 3,589,941 | 6/1971 | Eaton et al. | 429/38 X |
| 4,317,864 | 3/1982 | Strasser | 429/38 X |
| 4,476,196 | 10/1984 | Poepper et al. | 429/32 |
| 5,023,152 | 6/1991 | Akagi | 429/32 |
| 5,085,950 | 2/1992 | Prundahl | 429/32 X |

FOREIGN PATENT DOCUMENTS 0406523  1/1991  European Pat. Off. .
4016157 12/1990  Fed. Rep. of Germany .

Primary Examiner—Stephen Kalafut
Attorney, Agent, or Firm—Gifford, Groh, Sprinkle, Patmore and Anderson

[57] ABSTRACT

A fuel cell has a plurality of first and second plate members laid one on another with a predetermined phase relationship therebetween. Each first plate member houses a cell. The first plate member includes a cell-housing portion, a cell-insertion opening having two spaces communicating with opposed openings of an inner-cell flow passage of the housed cell and a plurality of communication openings. The second plate member includes an inter-cell flow passage forming portion facing the cell housed in the first plate member, an inter-cell flow passage forming opening having two spaces and a plurality of a plurality of communication openings. The inter-cell flow passage forming portion forms an inter-cell flow passage between adjacently disposed cells as the first and second plate members are laid one on the other. The communication openings and the spaces of the plate members provide air feed passages and air exhaust passages for the inter-cell flow passage and the inner-cell flow passage.

16 Claims, 17 Drawing Sheets

FUEL CELL

BACKGROUND OF THE INVENTION

1. Field of the Invention

The present invention relates to a fuel cell, and more particularly to a fuel cell including a plurality of cells each having a three-layer plate assembly and a separator affixed to the plate assembly. The three-layer assembly consists essentially of a solid electrolyte layer, an oxygen electrode affixed to one side of the electrolyte layer and a fuel electrode affixed to the other side of the electrolyte layer. As assembled, each cell forms an intra-cell flow passage and an inter-cell flow passage is formed between each adjacent pair of cells. One of the intra-cell flow passage and the inter-cell flow passage acts as an oxygen-containing gas flow passage for the oxygen electrode while the other acts as a fuel flow passage for the fuel electrode of each cell.

2. Description of the Related Art

FIGS. 19 and 20 show a typically conventional fuel cell. This fuel cell includes a plurality of three-layered structures and separator plates 4 layered one on another alternatively. Each separator plate 4 defines a plurality of laterally extending grooves 'm' in one side and a plurality of vertically extending grooves 'n' in the other side. One separator 4 and one three-layered structure together form a ceramic cell multi-layered assembly. As a plurality of the cell assemblies are integrated with each other through a sintering process, so that the grooves 'm' and the further grooves 'n' of the separators 4 form two kinds of flow passages respectively. One kind of these flow passages provide an intra-cell flow passage f1 while the other kind of the flow passages provide an inter-cell flow passage f2 and either of the passages f1 and f2 is used as an oxygen-containing gas flow passage for the oxygen electrode 2 of the cell 6 while the other is used as a fuel flow passage for the fuel electrode 3 of the cell 6. An electrolyte layer 1 is sandwiched between the oxygen electrode 2 and the fuel electrode 3.

In the drawings, marks F1 and F2 denote an air feed passage and an air exhaust passage for the inner-cell flow passages f1. Similarly, further marks F3 and F4 denote an air feed passage and an air exhaust passage for the inter-cell flow passages f2. Numerals 26, 27 denote partition walls for partitioning the air feed passage F1 and the air exhaust passage F2.

According to the above-described conventional construction, the plurality of cells 6 are placed in close contact with each other and are sintered in this condition for the integration, so that the assembly can not compensate for thermal distortion occurring in the plate-like cells 6. So that, cracks tend to occur at the cells 6 and consequently the fuel may leak from the fuel flow passage thereby damaging the entire fuel cell.

According to one conventional attempt to overcome the above problem, there is provided a gap at the region of the inter-cell flow passage f2 between an adjacent pair of plate-like cells 6 each comprising a separator 4 having the intra-cell flow passage f1 affixed to one side (either the side of the oxygen electrode 2 or the fuel electrode 3) of the three-layer plate assembly, so that the gap may effectively absorb the thermal distortion to protect the fuel cell.

One specific construction of the above type is shown in FIGS. 21, 22 and 23. In this construction, an inner space of a casing 20 is partitioned into three regions by means of a pair of parallel partition walls 21, 22. Each of the partition walls 21, 22 has a plurality of parallel extending slit openings 23 for allowing insertion of a cell. Then, the cell 6 is inserted through the slit openings 23 of the two partition walls 21, 22 with opposed openings of the intra-cell flow passage f1 formed by the separator 4 being oriented to face one outer partitioned region 20c and the other outer partitioned region 20a respectively. Then, at the central partitioned region 20b between the adjacent cells 6, there is formed the inter-cell flow passage f2, so that the cells 6 are spaced from each other at this central partitioned region 20b. One side of the central partitioned region 20b relative to the position of the cell provides the air feed passage F3 for each inter-cell flow passage f2 while the other side of the region 20b provides the air exhaust passage F4 for the inter-cell flow passage f2. Also, the outer partition region 20a provides the air exhaust passage F2 for the intra-cell flow passages f1.

The above-described modified construction can indeed avoid the problem of cracks in the cells 6 due to thermal distortion. On the other hand, the assembly has a minimal opening dimension in the direction of the thickness of the cell. Moreover, the assembly requires the formation of the plurality of stages of the slit openings 23 for allowing insertion of the cells with each opening 23 requiring high precision for providing sufficient air-tightness. Furthermore, the plurality of cells 6 must be inserted from one side through the slit openings 23 of the partition walls 21, 22, so that the assembly is very troublesome and costly.

The prior art provides another modified construction, which is shown in FIGS. 24 and 25. In the case of this construction, on each side of the plate-like cell 6, there is provided a first spacer 24 having a thickness substantially equal to and a length longer than the cell 6. Further, on opposed ends of these first spacers 24, there are laid a pair of second spacers 25. Then, on these second spacers 25, there are laid a further cell 6 and further first spacers 24. As these overlaying operations are repeated, between each adjacent cells 6, there is formed an inter-cell flow passage f2 which opposed sides are partitioned by the pair of second spacers 25, so that the adjacent cells 6 are spaced apart from each other at the region of the inter-cell flow passage f2. Further, to four faces of this multi-layer assembly, there are respectively connected an air duct 30 forming an air feed passage F1 for the intra-cell flow passages f1, a further air duct 31 for forming an air exhaust passage F2 for the intra-cell flow passages f1, a still further air duct 28 for forming an air feed passage F3 for the inter-cell flow passages f2 and a still further air duct 29 for forming an air exhaust passage F4 for the inter-cell flow passages f2.

This construction can eliminate the formation of the plurality of slit openings 23. Yet, the construction requires a great number of parts to be assembled with each other, such as the great number of spacers 24, 25 and the four air ducts 28, 29, 30 and 31. Further, it is difficult to connect the air ducts 28, 29, 30, 31 to the multi-layer assembly having the spacers 24, 25 with good air-tightness. Therefore, this construction again suffers the problem of troublesome and costly assembly.

SUMMARY OF THE INVENTION

Taking the above-described state of the art into consideration, the primary object of the present invention is to provide an improved fuel cell through use of an ingenious cell disposing arrangement, the improved cell allowing easy and inexpensive assembly yet effectively protecting the cell against damage due to thermal distortion.

For fulfilling the above-noted object, a fuel cell, according to the present invention, comprises:

a plurality of plate-like cells arranged side by side in a direction of thickness of the cell to provide inter-cell flow passages between adjacently disposed cells, each said cell including, a three-layer plate assembly having a solid electrolyte layer, an oxygen electrode affixed to one side of the electrolyte layer and a fuel electrode affixed to the other side of the electrolyte layer, and a separator attached to said three-layer assembly in such a manner as to provide an intra-cell flow passage in cooperation with one of said oxygen electrode and said fuel electrode;

a first plate member having a thickness substantially corresponding to a thickness of said cell;

a second plate member to be laid on said first plate member with an alternating stacking relationship relative thereto;

said first plate member forming a cell-insertion opening including a cell housing portion for housing the cell and first and second spaces for respectively communicating with opposed opened ends of said intra-cell flow passage of the cell with the cell being housed at said cell housing portion, said first plate member further forming a first communication opening and a second communication opening;

said second plate member forming an inter-cell flow passage forming opening including an inter-cell flow passage forming portion facing said cell when said cell is housed at said first plate member, a third space communicating with said first communication opening at one terminal end of said inter-cell flow passage forming portion and a fourth space communicating with said second communication opening at the other terminal end of said inter-cell flow passage forming portion, said second plate member further forming a third communication opening communicating with said first space and a fourth communication opening communicating with said second space;

said inter-cell flow passage being formed between said respective adjacent cells by said inter-cell flow passage forming portions as said first plate member housing said cell and said second plate member are laid one on another;

said first communication opening in cooperation with said third space and said second communication opening in cooperation with said fourth space form continuous flow passages which provide an air feed passage and an air exhaust passage for said inter-cell flow passage respectively; and said first space in cooperation with said third communication opening and said second space in cooperation with said fourth communication opening form further continuous flow passages which provide an air feed passage and an air exhaust passage for said intra-cell flow passage respectively.

Functions and effects of the above-described construction will be described next.

This construction can be embodied as shown in FIGS. 1 through 5, for example. The first plate member 9 forms the cell-insertion opening 11, the first communication opening 12 and the second communication opening 13. The second plate member 10 forms the inter-cell flow passage forming opening 14, the third communication opening 15 and the fourth communication opening 16. Then, a plurality of these first and second plate members 9, 10 are alternately laid one on another with an alternating stacking relationship relative to each other.

The inter-cell flow passage forming opening 14 of each second plate member 10 has the inter-cell flow passage forming portion 14a facing the cell 6 housed in the adjacent first plate member 9. The inter-cell flow passage forming opening 14 further has the third space 14b adjacent one terminal end of the inter-cell flow passage forming portion 14a and the fourth space 14c adjacent the other terminal end of the portion. Accordingly, between each adjacent pair of cells 6, the inter-cell flow passage forming portions 14a of the inter-cell flow passage forming openings 14 form the inter-cell flow passage f2 extending through the third space 14b and the fourth space 14c. Then, as this second plate member 10 having the inter-cell flow passage forming opening 14 is interposed between the first plate members 9 each housing the cell 6, these adjacent cells 6 are spaced apart from each other at the region of the inter-cell flow passage f2.

The third space 14b of the inter-cell flow passage forming opening 14 of each second plate member 10 is communicated with the first communication opening 12 of the first plate member 9, such that the first communication opening 12 and the third space 14b together provide one continuous flow passage F3 extending along the over-laying direction of the plate members. And, this continuous flow passage F3 is communicated, at each third space 14b, with one terminal side of the inter-cell flow passage forming portion 14a, i.e. one terminal end of the inter-cell flow passage f2 formed by the inter-cell flow passage forming portion 14a.

On the other hand, the fourth space 14c of the inter-cell flow passage forming opening 14 of each second plate member 10 is communicated with the second communication opening 13 of the first plate member 9, such that the second communication opening 13 and the fourth space 14c together provide a further continuous flow passage F4 extending also along the over-laying direction of the plate members. And, this continuous flow passage F4 is communicated, at each fourth space 14c, with the other terminal side of the inter-cell flow passage forming portion 14a, i.e. with the other terminal end of the inter-cell flow passage f2 formed by the inter-cell flow passage forming portion 14a.

In short, the flow passage F3 formed by the first communication opening 12 and the third space 14b and the further flow passage F4 formed by the second communication opening 13 and the fourth space 14c respectively provide an air feed passage and an air exhaust passage for the inter-cell flow passage f3 between the adjacent cells 6.

The first space 11b of the cell-insertion opening 11 of each first plate member 9 is communicated with the third communication opening 15 of the second plate member 10, such that the first space 11b and the third communication opening 15 together provide a continuous flow passage F1. And, since the first space 11b of the cell-insertion opening 11 of the first plate member 9 is communicated with one terminal opening of the intra-cell flow passage f1 of the cell 6 housed at the cell-housing portion 11a, the flow passage F1 is communicated with one terminal opening of the intra-cell flow passage f1 at each first space 11b.

Further, since the second space 11c of the cell-housing opening 11 of the first plate member 9 is communicated with the fourth communication opening 16 of the second plate member 10, the second space 11c and the fourth communication opening 16 together form a continuous flow passage F2 extending in the overlaying direction of the plate members. Then, since the second space 11c at the cell-housing opening 11 of each first plate member 9 is communicated with the other terminal opening of the intra-cell flow passage f1 of the cell 6 housed at the cell-housing portion 11a, the continuous flow passage F2 is communicated with the other terminal opening of the intra-cell flow passage f1 at each second space 11c.

That is, the flow passage F1 formed by the first space 11b and the third communication opening 15 and the further flow passage F2 formed by the second space 11c and the fourth communication opening 16 provide the air feed passage and the air exhaust passage for the intra-cell flow passage f1 of the cell 6, respectively.

Incidentally, in the cell construction, if the separator 4 is provided to form the intra-cell flow passage f1 in cooperation with the oxygen electrode 2, this intra-cell flow passage f1 is used as the oxygen-containing gas flow passage; whereas, the inter-cell flow passage f2 formed between the adjacent cells 6 spaced apart from each other is used as the fuel flow passage. And, the continuous flow passage F4 formed by the first communication opening 12 and the third space 11b and the further continuous flow passage F4 formed by the second communication opening 13 and the fourth space 14c act, respectively, as the air feed passage and the air exhaust passage for the fuel flow passage between the cells 6.

Alternately, if the separator 4 is so provided as to form the intra-cell flow passage f1 in cooperation with the fuel electrode 3, this intra-cell flow passage f1 is used as the fuel flow passage; whereas, the inter-cell flow passage f2 formed between the adjacent cells 6 spaced apart from each other is used as the oxygen-containing gas flow passage. And, the continuous flow passage F3 formed by the first communication opening 12 and the third space 14c and the further continuous flow passage F4 formed by the second communication opening 13 and the fourth space 14c are used, respectively, as the air feed passage and the air exhaust passage for the oxygen-containing gas flow passage formed between the adjacent cells 6. Further, the flow passage F1 formed by the first space 11b and the third communication opening 15 and the further flow passage F2 formed by the second space 11c and the fourth communication opening 16 are used, respectively, as the air feed passage and the air exhaust passage for the fuel flow passage of the cell 6.

According to the above-described constructions of the present invention, the plurality of plate-like cells arranged in the direction of the cell thickness are spaced apart from each other at the inter-cell flow passage region formed between the adjacent cells, such that the distance between the adjacent cells can effectively absorb thermal distortion occurring at the cells thereby to protect the cells against the physical damage due to such distortion and the resultant leakage of the fuel from the fuel flow passage.

Moreover, the formation of the various openings in the respective plate members can be done much more easily than the afore-described modified conventional construction which requires the formation of a plurality of stages of very small slit openings each having an opening dimension corresponding to the thickness of the cell. Further, through the simple assembly operation of alternately overlaying the first and second plate members having the respective openings, the inter-cell flow passage between the cells, the air feed and air exhaust passages for the inter-cell flow passage and also the air feed and air exhaust passages for the intra-cell flow passage can be formed at one time. As a result, the invention has fully achieved its intended object of providing an improved fuel cell through use of an ingenious cell disposing arrangement, the improved cell allowing easy and inexpensive assembly yet effectively protecting the cell against damage due to thermal distortion.

Further, and other objects, features and effects of the invention will become more apparent from the following more detailed description of the embodiments of the invention with reference to the accompanying drawings.

DESCRIPTION OF THE PREFERRED EMBODIMENTS

Preferred embodiments of a fuel cell according to the present invention will now be described in details with reference to the accompanying drawings.

FIGS. 1 through 5 show a fuel cell according to a first embodiment of the present invention. This fuel cell includes a three-layer plate assembly consisting essentially of a rectangular solid electrolyte layer 1, a film or plate-like oxygen electrode 2 affixed to a substantially entire one side face of the electrolyte layer 1 and a film or plate-like fuel electrode 3 affixed to a substantially entire other side face of the layer 1, so that electromotive forece is generated through the oxygen electrode 2 and the fuel electrode 3.

The solid electrolyte layer 1 is formed of any appropriate material such as tetragonal $ZrO_2$ obtained as a solid-solution with Yt, which is $Y_2O_3$ 3 mol % thereof. The oxygen electrode 2 is formed of such appropriate material as $LaMnO_3$. The fuel electrode 3 is formed of any appropriate material such as a cermet of Ni and $ZrO_2$.

Figure 5:
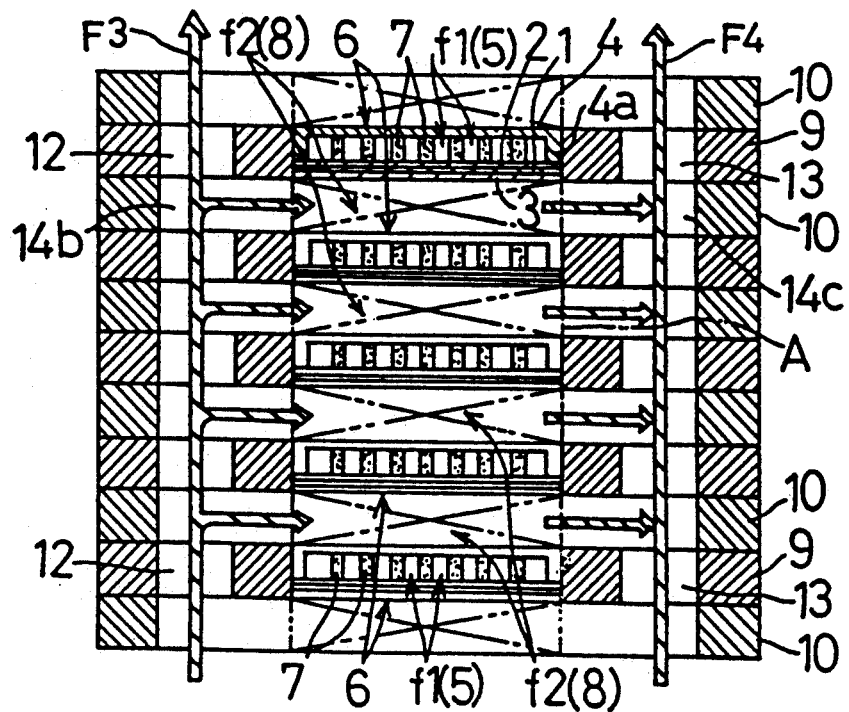
FIG. 5 is a section view taken in a direction normal to the direction of the section of FIG. 4.

To the side of the oxygen electrode 2 affixed to the three-layer assembly, there is attached a conductive separator 4 having a pair of ridges 4a with these ridges 4a being affixed through the entire length thereof to the solid electrolyte layer 1 (in this respect, in FIG. 5, the ridges 4a seem affixed to the oxygen electrode 2. However, since this oxygen electrode 2 is porous in nature, the ridges 4a are actually affixed to the solid electrolyte layer 1). With these, a plate-like cell 6 for the fuel cell is formed with the cell 6 having an intra-cell flow passage f1 between the oxygen electrode 2 and the separator 4.

The above-described intra-cell flow passage f1 provides an oxygen-containing gas flow passage 5 for the oxygen electrode 2.

The separator 4 is formed of any appropriate material such as $LaCrO_3$ having good resistance against corrosion by oxidation and reduction.

Inside the intra-cell flow passage f1 used as the oxygen-containing gas flow passage 5, there are arranged flexible conductors 7 capable of absorbing thermal distortion substantially in parallel with and equidistantly relative to each other and in close vicinity of the oxygen electrode 2 and the separator 4, thereby allowing a large cross sectional area for electricity conductivity from the oxygen electrode 2 to the separator 4 as cell terminals.

Specifically, each conductor 7 is formed of any appropriate material such as felt-like material of LaMnO having good resistance against heat and acid.

Then, a plurality of the cells 6 are disposed in the direction of thickness of the cells, with inter-cell flow passages f2 as fuel flow passages 8 being formed between adjacent cells 6 and with the intra-cell flow passages f1 as the oxygen-containing gas flow passages 5 being isolated from the inter-cell flow passages f2 as the fuel flow passages 8. Next, an electricity generating unit of this fuel cell will be described.

There is provided a first plate member 9 having substantially the same thickness as the cell 6 and there is also provided a second plate member 10 which is to be laid on the first plate member 9 with a predetermined phase relationship relative thereto. The first member 9 includes a cell-insertion opening 11. A central portion of this cell-insertion opening 11 between opposed end faces of the cell where the intra-cell flow passage f1 is closed by the separator 4 and inner face portions of the opening opposing to the end faces of the cell provides a cell-housing portion 11a. And, only a portion of the oxygen-containing gas inlet opening is sealed in an air-tight manner. That is, at the portion of the oxygen-containing gas inlet on the upper and lower faces where the first plate member 9 and the second plate member 10 are overlapped with each other, the inner face of the first plate member 9 and a seal member together provide the air-tight sealing while an oxygen-containing gas outlet opening remains un-sealed for allowing absorption of thermal expansion. Further, opposed sides adjacent the cell-housing portion 11a of the cell-insertion opening 11 provide first and second spaces 11b, 11c for communicating respectively with the opposed terminal openings of the intra-cell flow passage f1 as the oxygen-containing gas flow passage 5 for the housed cell 6 (i.e. for communicating respectively with the opposed terminal openings of the intra-cell flow passage f1).

In providing the air-tightness between the opposed end faces of the cell 6 where the intra-cell flow passage f1 is closed and the inner face portions of the cell-insertion opening 11 opposed to the end faces of the cell, an arrangement is made so as to allow thermal contraction in the extending direction of the intra-cell flow passage f1 of the housed cell 6 (i.e. thermal contraction of the housed cell 6 utilizing the gaps created by the first and second spaces 11b, 11c).

The first plate member 9 defines a first communication opening 12 and a second communication opening 13 on opposed sides of the cell-housing portion 11a in a direction extending normal to the disposing direction of the cell-housing portion 11a, the first and second spaces 11b, 11c of the cell-insertion opening 11.

On the other hand, the second plate member 10 defines an inter-cell flow passage forming opening 14. A central portion of this inter-cell flow passage forming portion 14 provides an inter-cell flow passage forming portion 14a facing a plate face of the cell 6 housed in the first plate member 9, with opposed edges of the plate face of the cell 6 housed in the first plate member 9 and open edges facing the opposed plate face edges being kept in the air-tight condition. Further, opposed portions across the inter-cell flow passage forming portion 14a of the inter-cell flow passage forming opening 14 provide a third space 14b communicating with the first communication opening 12 of the first plate member 9 and a fourth space 14c communicating with the second communication opening 13 of the first plate member 9, respectively.

The second plate member 10 defines a third communication opening 15 communicating with the first space 11b of the cell-insertion opening 11 of the first plate member 9 and a fourth communication opening 16 communicating with the second space 11c of the cell-insertion opening 11 of the first plate member 9, on opposed sides of the inter-cell flow passage forming portion 14a in a direction extending normal to the disposing direction of the inter-cell flow passage forming portion 14a and the third and fourth spaces 14b, 14c of the inter-cell flow passage forming opening 14.

Figure 1:
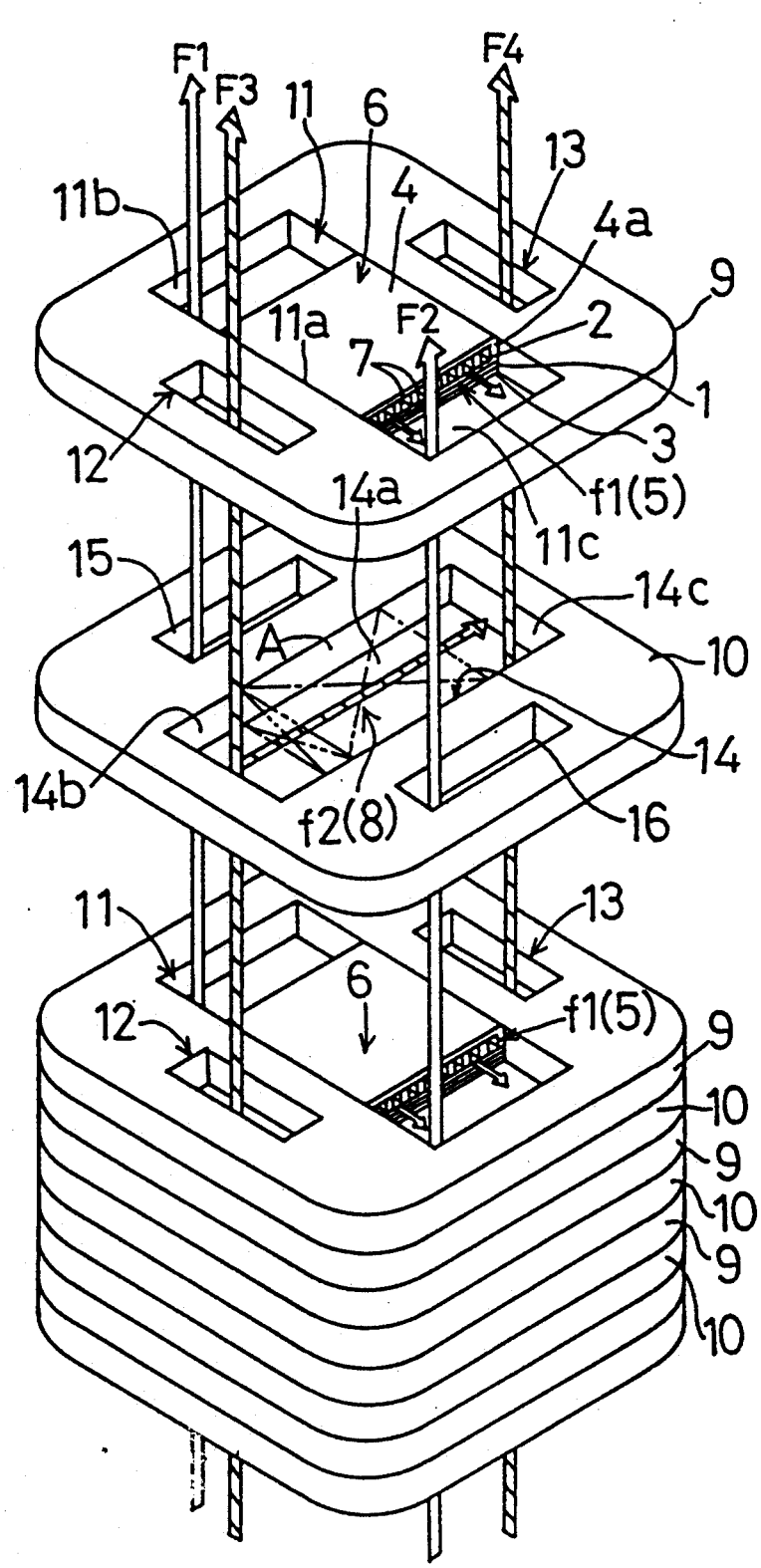
FIG. 1 is an exploded perspective view showing a fuel cell according to one preferred embodiment of the present invention.
Figure 2:
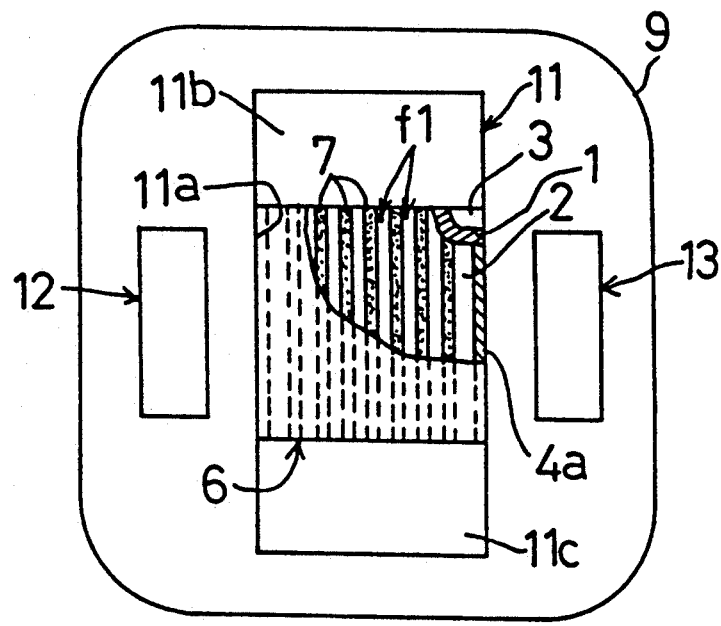
FIG. 2 is a plane view of a first plate member.
Figure 3:
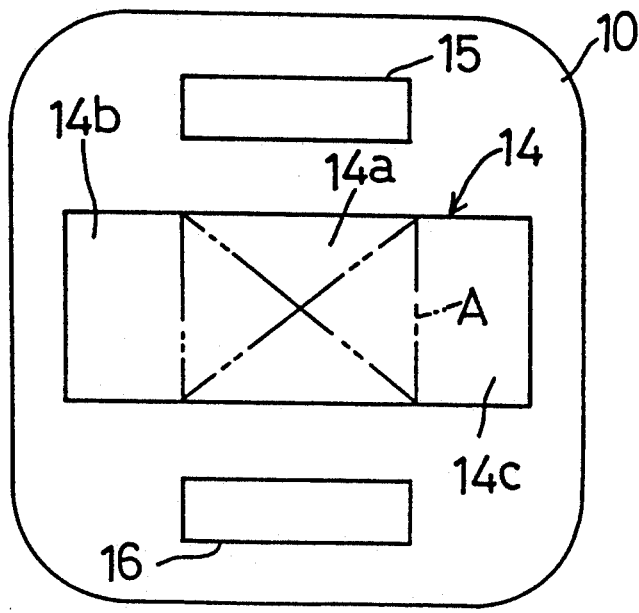
FIG. 3 is a plane view of a second plate member.
Figure 4:
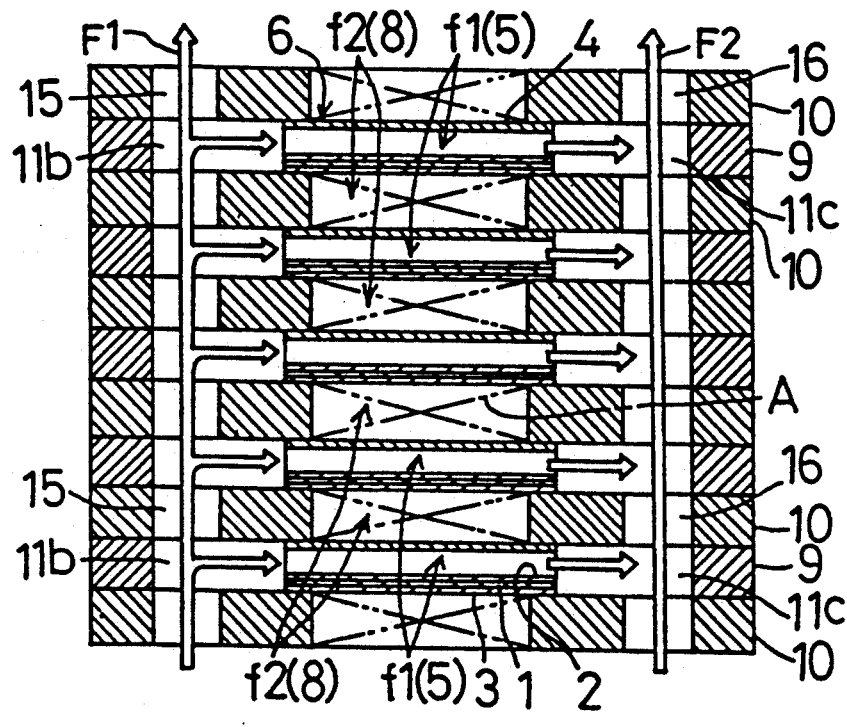
FIG. 4 is a section view.

Then, as illustrated in FIGS. 4 and 5, the second plate member 10 and the first plate member 9 are laid one on the other with a predetermined phase relation therebetween, with the inter-cell flow passage forming portion 14a of the inter-cell flow passage forming opening of the second plate member 10 being filled with a flexible metal fiber material A (e.g. of Ni) having gas permeability and capable of absorbing thermal distortion of the cell 6 in the direction of its thickness. The inter-cell flow passage forming portion 14a of the inter-cell flow passage forming opening 14 of each second plate member 10 forms, between the adjacent cells, an inter-cell flow passage f2 (i.e. the passage for allowing passage of fuel through the gas-permeable metal fiber material A) as a fuel flow passage 8. Accordingly, the adjacent cells 6 are spaced apart from each other at the region of the inter-cell flow passage f2. Further, the first space 11b of the cell-insertion opening 11 of the first plate member 9 and the third communication opening 15 of the second plate member 10 together form one continuous flow passage F1 extending in the over-laying direction of the plate members. This flow passage F1 acts as an air feed passage for the inner-cell flow passage f1 used as the oxygen-containing gas flow passage 5. The second space 11c of the cell-insertion opening 11 of the first plate member 9 and the fourth communication opening 16 of the second plate member 10 together form a further continuous flow passage F2 extending in the over-laying direction of the plate members. This flow passage F2 acts as an air exhaust passage for the intra-cell flow passage f1 used as the oxygen-containing gas flow passage 5. Also, the first communication opening 12 of the first plate member 9 and the third space 14a of the inter-cell flow passage forming opening 14 of the second plate member 10 together form a continuous flow passage F3 extending in the over-laying direction of the plate members. This flow passage F3 acts as an air feed passage for the inter-cell flow passage f2 formed between the adjacent cells 6 as the fuel flow passage 8. The second communication opening 13 of the first plate member 9 and the fourth space 14b of the inter-cell flow passage forming opening 14 of the second plate member 10 together form a further continuous flow passage F4 extending in the over-laying direction of the plate members. This flow passage F4 acts as an air exhaust passage for the inter-cell flow passage f2 formed between the adjacent cells 6 as the fuel flow passage 8.

With the above-described electricity generating unit of the fuel cell, each of the oxygen-containing gas flow passage 5 formed by the intra-cell flow passage f1 is supplied with such oxygen-containing gas as air, oxygen-rich air and oxygen. On the other hand, each fuel flow passage 8 formed by the inter-cell flow passage f2 is supplied with various kinds of fuel as $H_2$ supply source. As a result, at each cell 6, electricity is generated through the function of the solid electrolyte layer 1, and the electric power is collected from the great number of cells 6 electrically connected in series with each other.

Some other embodiments of the present invention will be specifically described next.

Figure 6:
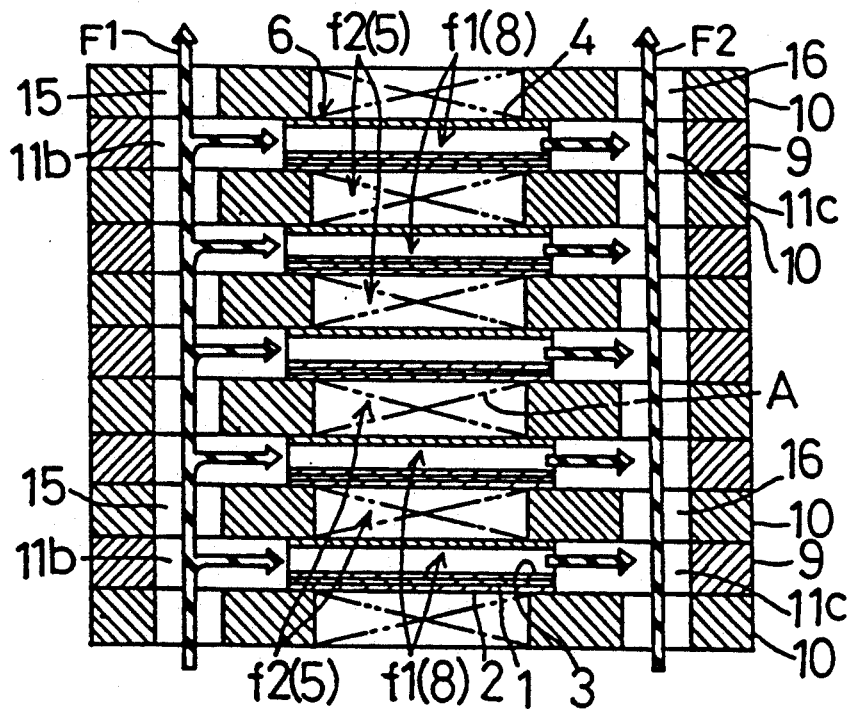
FIG. 6 is a section view showing a fuel cell according to a further embodiment of the present invention.
Figure 7:
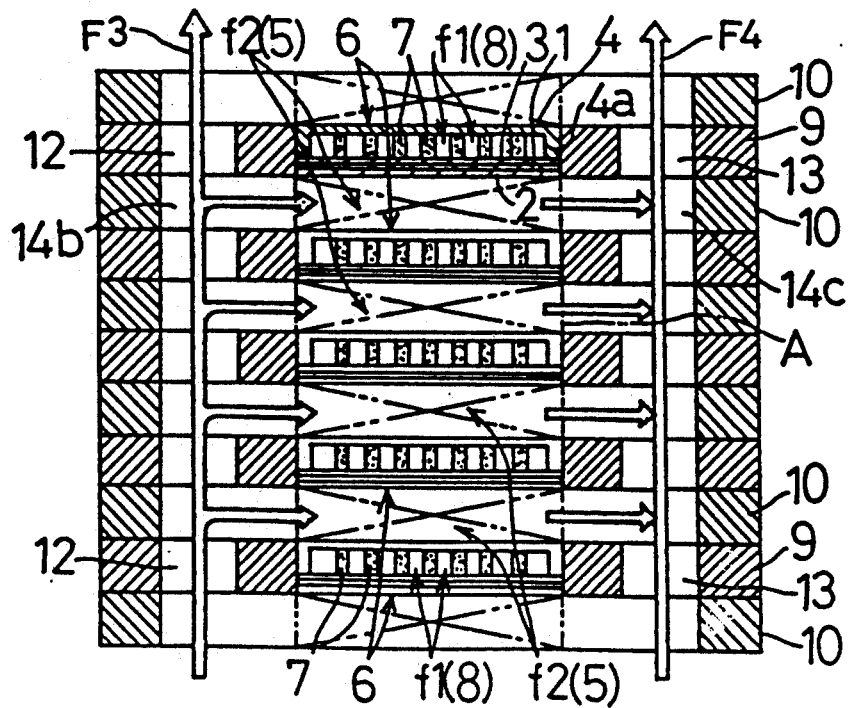
FIG. 7 is a section view taken in a direction normal to the direction of FIG. 6.
Figure 8:
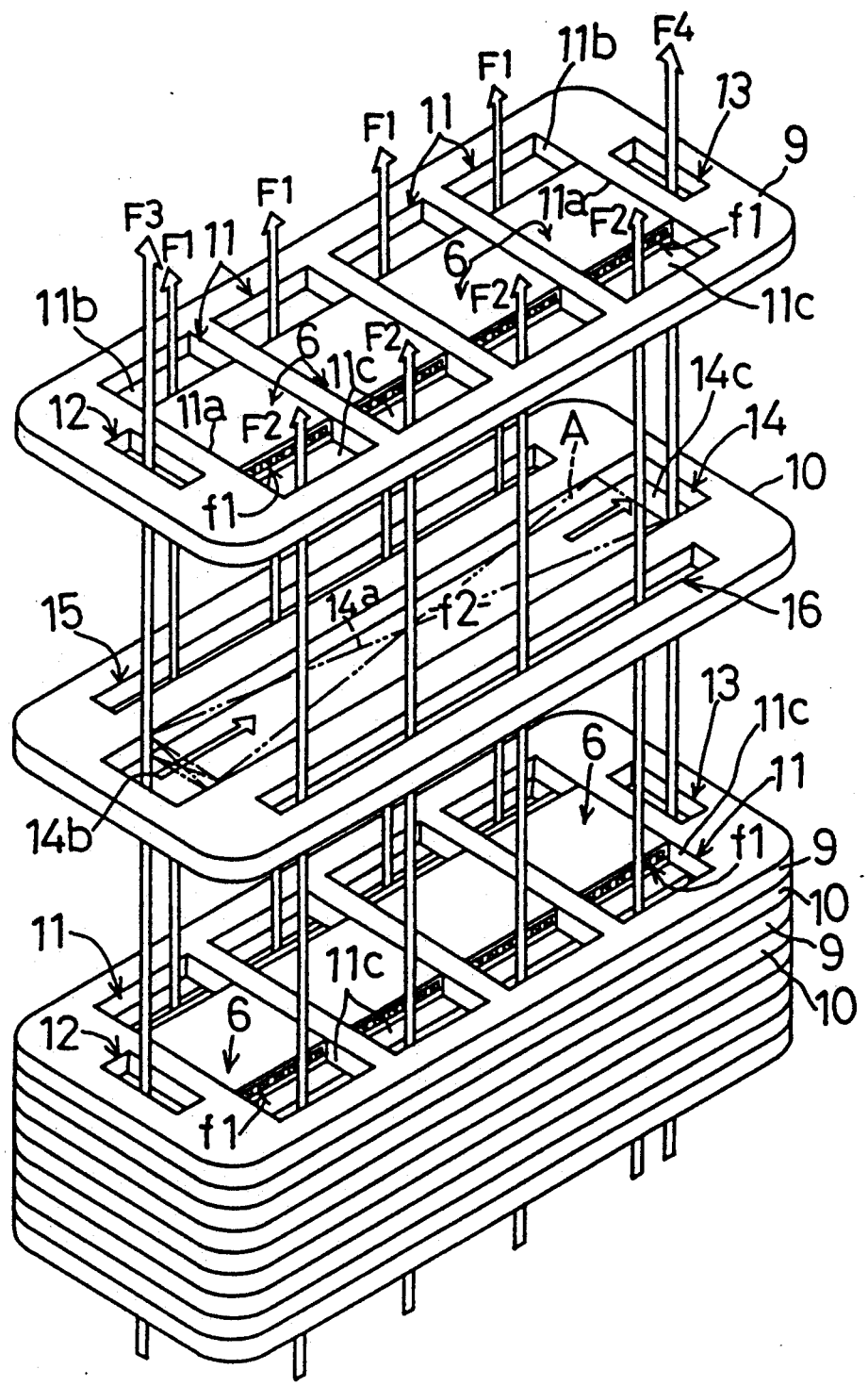
FIG. 8 is an exploded perspective view showing a fuel cell according to a still further embodiment of the present invention.
Figure 9:
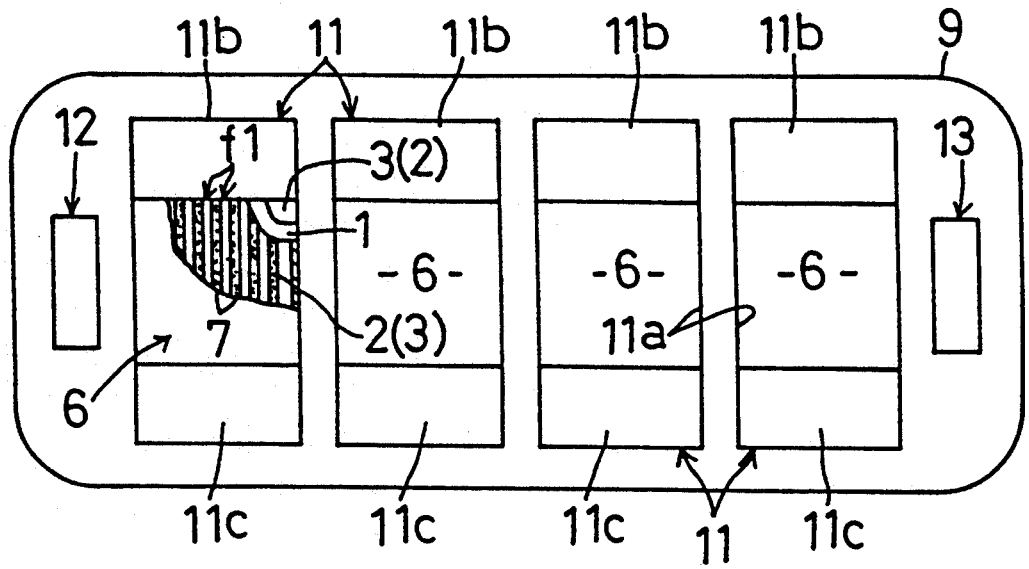
FIG. 9 is a plane view showing a first plate member used in the fuel cell of FIG. 8.
Figure 10:
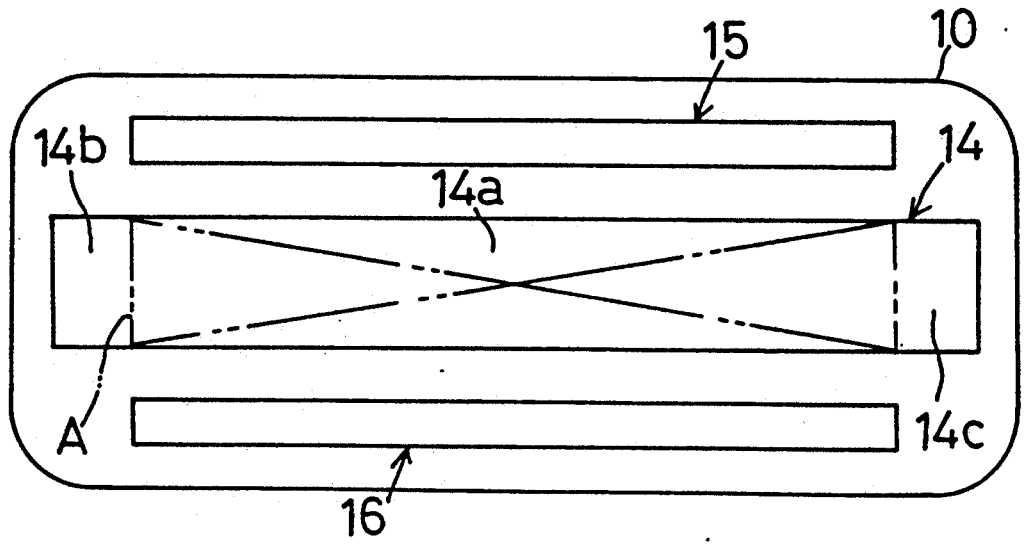
FIG. 10 is a plane view showing a second plate member used in the fuel cell of FIG. 8.
Figure 11:
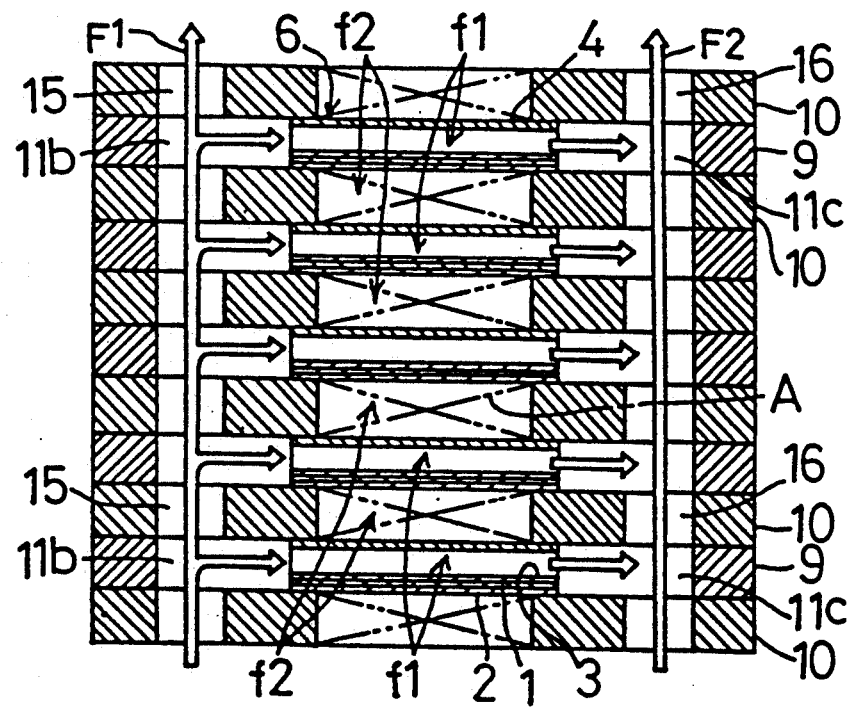
FIG. 11 is a section view of FIG. 8.
Figure 12:
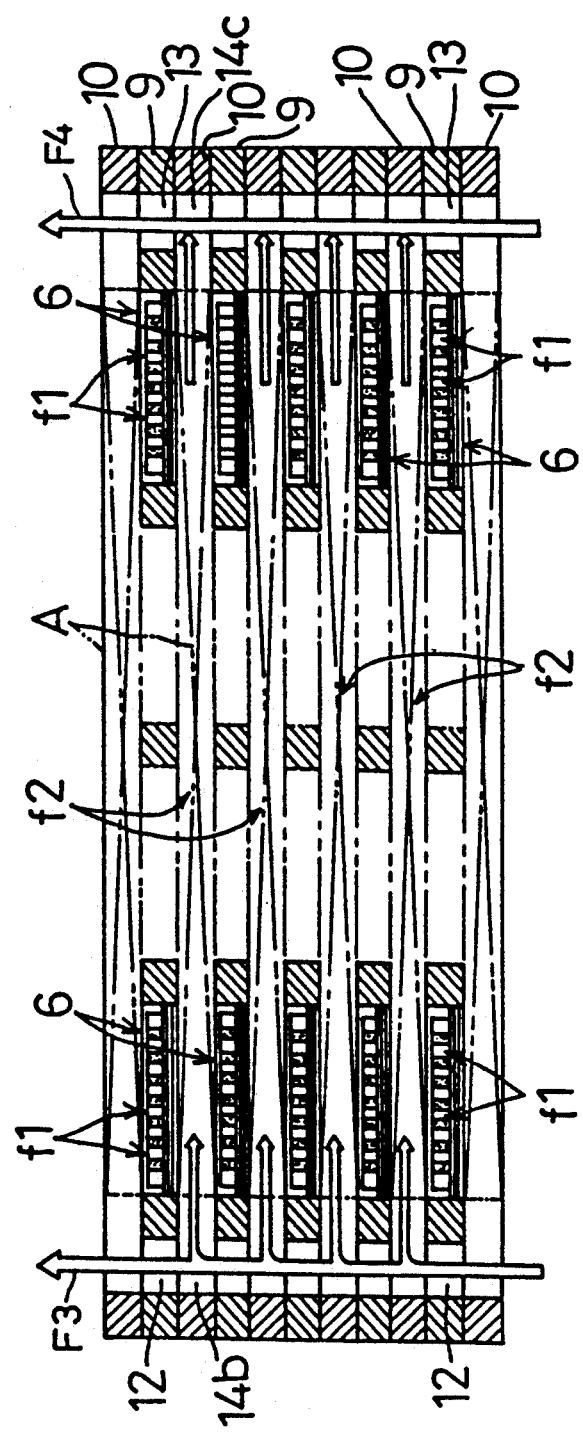
FIG. 12 is a section view taken along a direction normal to the section of FIG. 11.

In the foregoing embodiment, the separator 4 is disposed on the side of the oxygen electrode 2, such that the intra-cell flow passage f2 as the oxygen-containing gas flow passage 5 is formed between the separator 4 and the oxygen electrode 2. An alternate construction is possible as shown in FIGS. 6 and 7. In this alternate construction, at the cell 6, the separator 4 is disposed on the side of the fuel electrode 3 so as to form the intra-cell flow passage f1 as the fuel flow passage 8 between the separator 4 and the fuel electrode 3. With this arrangement, the first plate members 9 and the second plate members 10 are arranged in the manner described in the foregoing embodiment.

Specifically, in the alternate over-laying structure of the first plate members 9 and the second plate members 10, the inter-cell flow passage forming portion 14a of the inter-cell flow passage forming opening 14 of each second plate 10 provides the inter-cell flow passage f2 as the oxygen-containing gas flow passage 5 between the adjacent cells 6. Further, the continuous flow passage F1 formed by the first space 11b of the cell-insertion opening 11 of the first plate member 9 and the third communication opening 15 of the second plate member 10 and extending in the over-laying direction of the plate members and the further continuous flow passage F2 formed by the second space 11c of the cell-insertion opening 11 of the first plate member 9 and the fourth communication opening 16 of the second plate member 10 and extending in the over-laying direction of the plate members provide, respectively, the air feed passage and the air exhaust passage for the intra-cell flow passage f1 as the fuel flow passage 8. Similarly, the continuous flow passage F3 formed by the first communication opening 12 of the first plate member 9 and the third space 14a of the inter-cell flow passage forming opening 14 of the second plate member 10 and extending in the over-laying direction of the plate members and the further continuous flow passage F4 formed by the second communication opening 13 of the first plate member 9 and the fourth space 14b of the inter-cell flow passage forming opening 14 of the second plate member 10 provide, respectively, the air feed passage and the air exhaust passage for the inter-cell flow passage f2 as the oxygen-containing gas flow passage 5 between the adjacent cells 6.

A still further embodiment of the invention is illustrated in FIGS. 8 through 12. In this construction, the first plate member 9 defines a plurality of cell-insertion openings 11 arranged side by side. Whereas, the second plate member 10 defines a single inter-cell flow passage forming opening 14 having an inter-cell flow passage forming portion 14a corresponding to the cell-housing portion 11a of each of the plurality of cell-insertion openings 11 of the first plate member 9.

On the other hand, the second plate member 10 defines a third communication opening 15 corresponding and common to the first spaces 11b of the cell-insertion openings 11 of the first plate member 9 and a fourth communication opening 16 corresponding and common to the second spaces 11c of the cell-insertion openings 11 of the first plate member 9.

That is, in the over-laid assembly of the first plate member 9 and the second plate member 10, the intra-cell flow passage f1 of each housed cell 6 is communicated in parallel with the air feed passage and the air exhaust passage for the intra-cell flow passage provided respectively by the continuous flow passage F1 formed by the third communication opening 15 and the first space 11b and the continuous flow passage F2 formed by the fourth communication opening 16 and the second space 11c. On the other hand, the inter-cell flow passage f2 for the housed cells 6 is communicated serially with the air feed passage and the air exhaust passage for the inter-cell flow passage provided respectively by the continuous flow passage F3 formed by the first communication opening 12 and the third space 14b and the further continuous flow passage F4 formed by the second communication opening 13 and the fourth space 14c.

Figure 13:
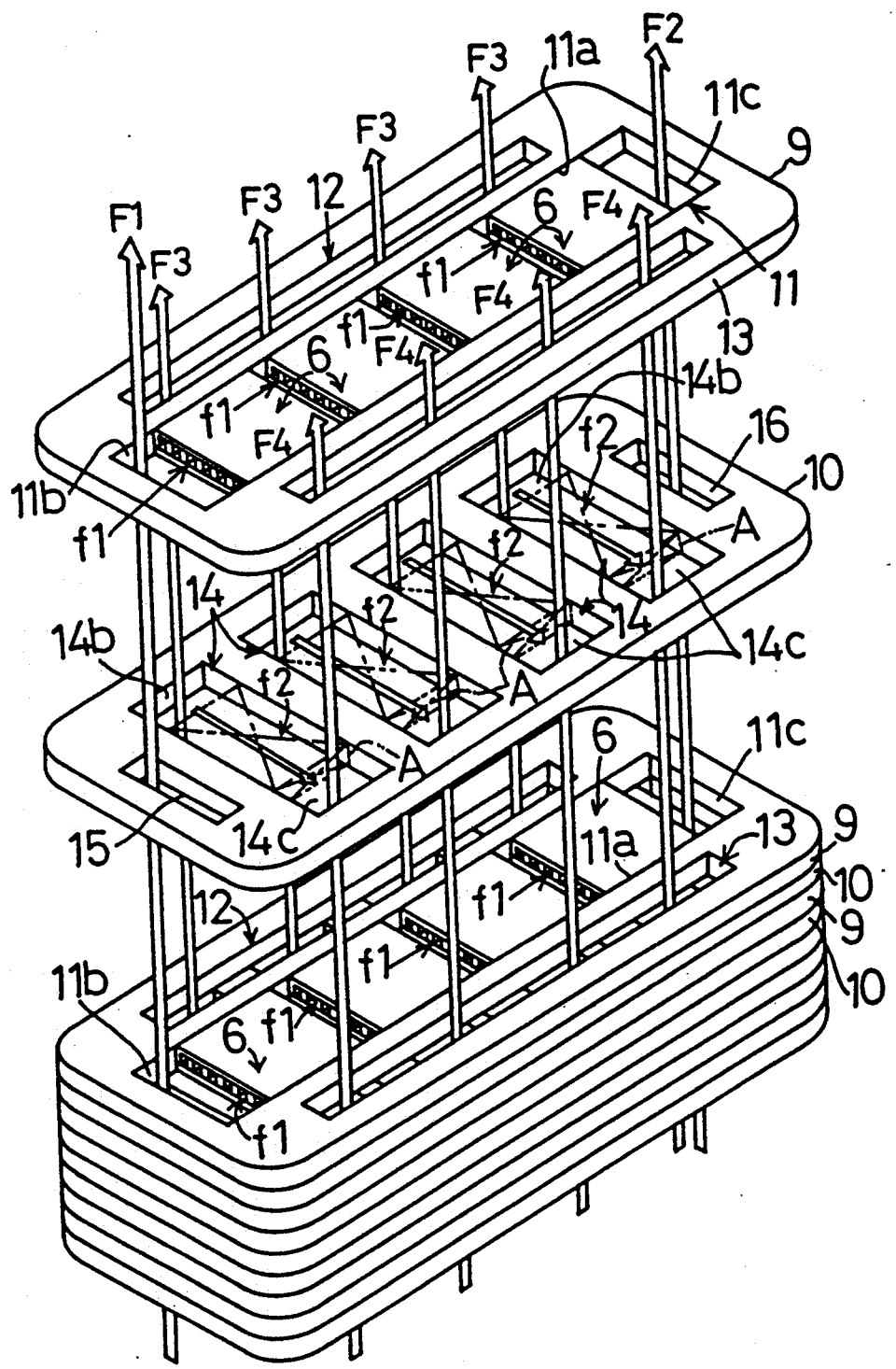
FIG. 13 is an exploded perspective view of a fuel cell according to a still further embodiment of the present invention.
Figure 14:
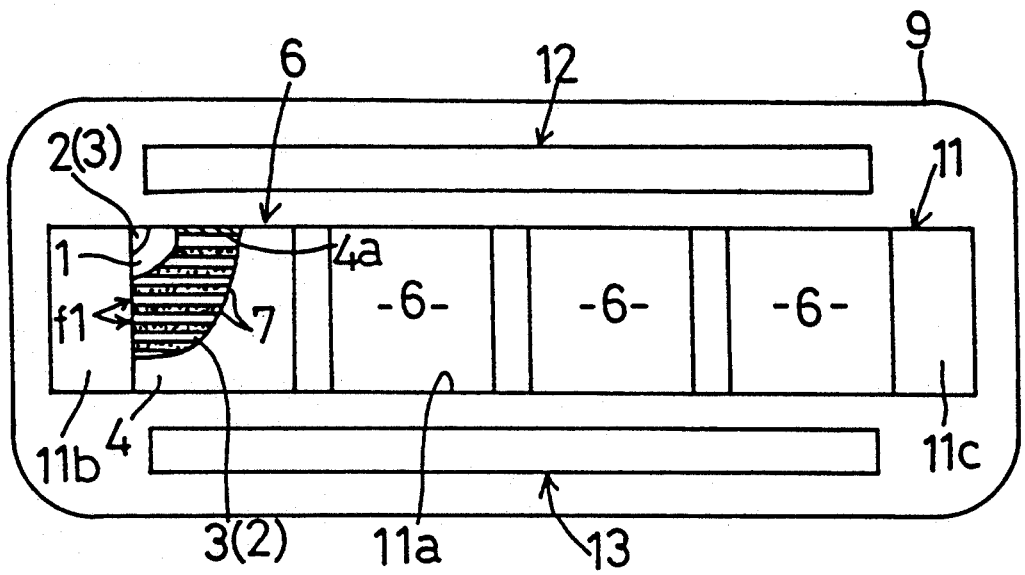
FIG. 14 is a plane view showing a first plate member used in the fuel cell of FIG. 13.
Figure 15:
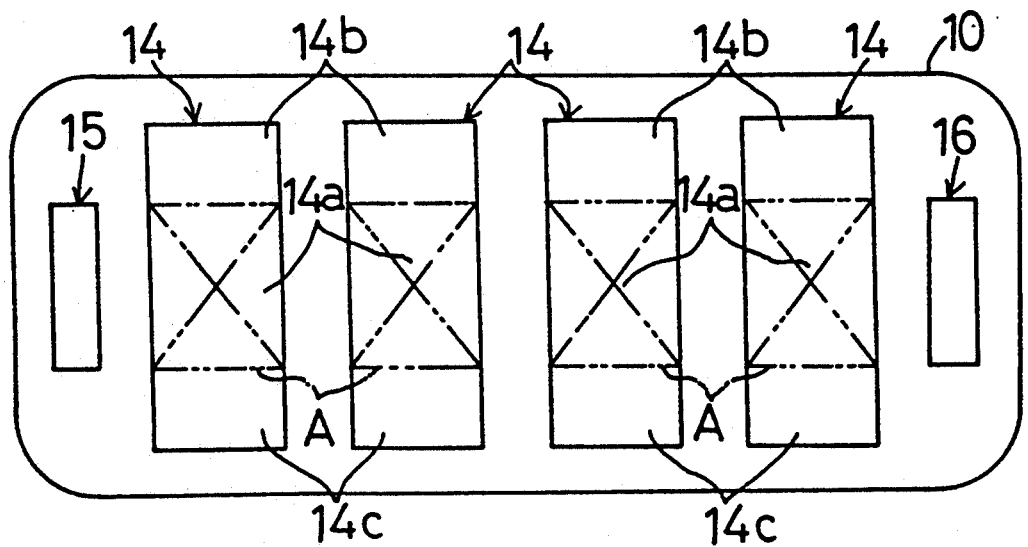
FIG. 15 is a plane view showing a second plate member used in the fuel cell of FIG. 13.

A still further embodiment of the invention is illustrated in FIGS. 13 through 15. In this construction, the first plate member 9 defines a cell-insertion opening 11 for housing a plurality of cells 6 with the intra-cell flow passages f1 of these cells being serially communicated with each other. On the other hand, the second plate member 10 defines a plurality of inter-cell flow passage forming openings 14 each corresponding to one of the plurality of the cells housed in the first plate member 9.

That is, in the over-laid assembly of the first plate member 9 and the second plate member 10, the intra-cell flow passage f1 of each housed cell 6 is communicated serially with the air feed passage and the air exhaust passage for the intra-cell flow passage provided respectively by the continuous flow passage F1 formed by the third communication opening 15 and the first space 11b and the continuous flow passage F2 formed by the fourth communication opening 16 and the second space 11c. On the other hand, the inter-cell flow passage f2 for the housed cells 6 is communicated in parallel with the air feed passage and the air exhaust passage for the inter-cell flow passage provided respectively by the continuous flow passage F3 formed by the first communication opening 12 and the third space 14b and the further continuous flow passage F4 formed by the second communication opening 13 and the fourth space 14c.

Figure 16:
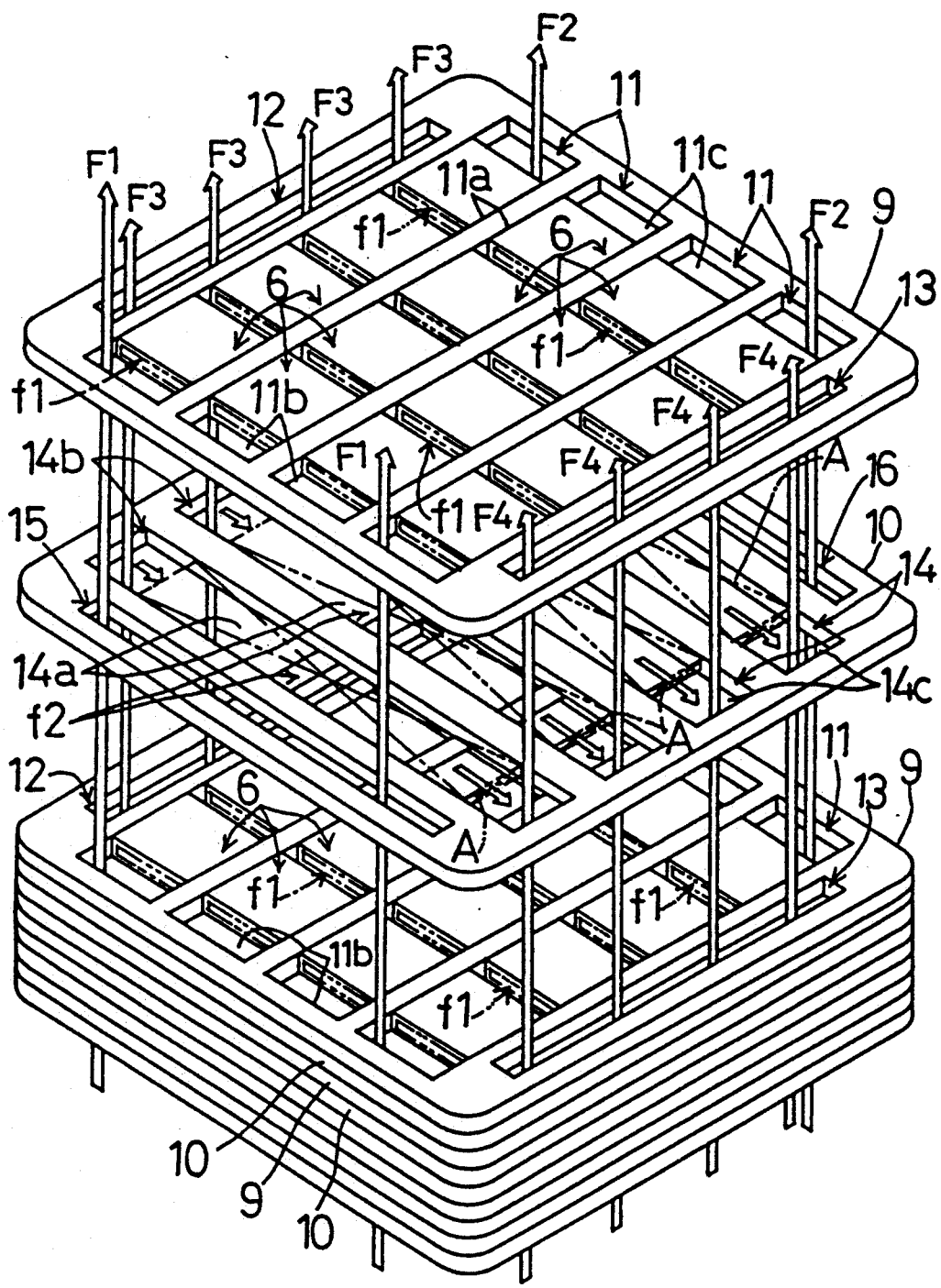
FIG. 16 is an exploded perspective view showing a fuel cell according to a still further embodiment of the present invention.
Figure 17:
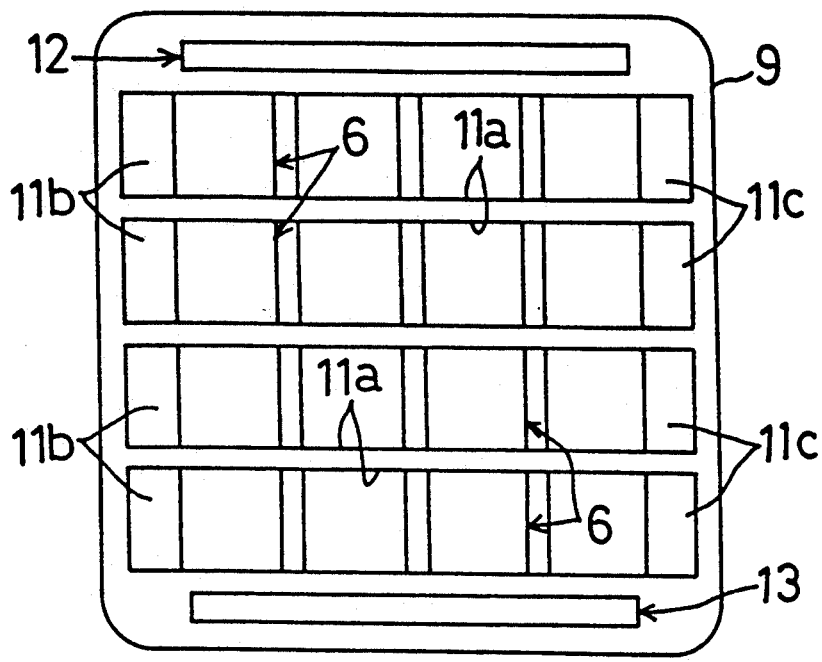
FIG. 17 is a plane view showing a first plate member used in the fuel cell of FIG. 16.
Figure 18:
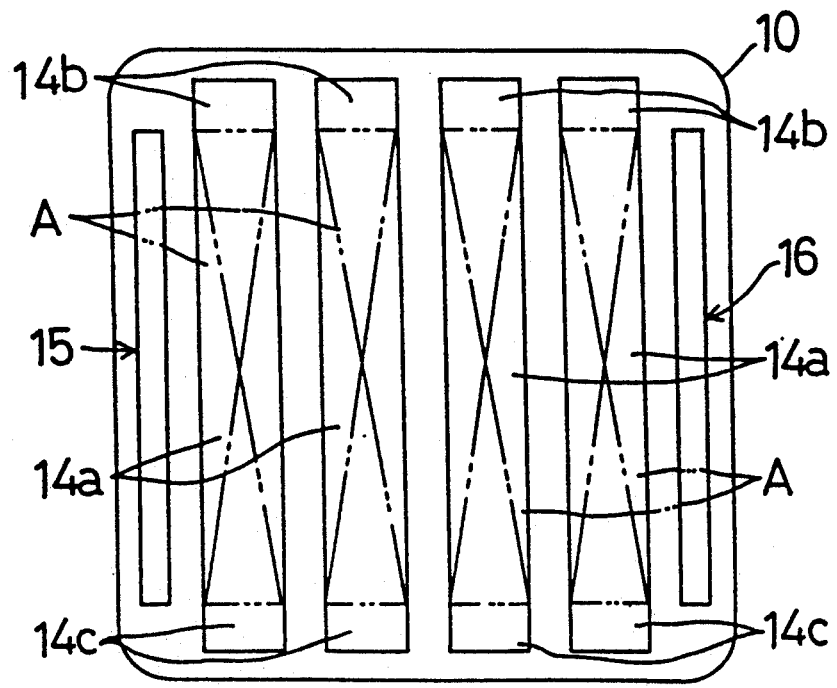
FIG. 18 is a plane view showing a second plate member used in the fuel cell of FIG. 17.
Figure 19:
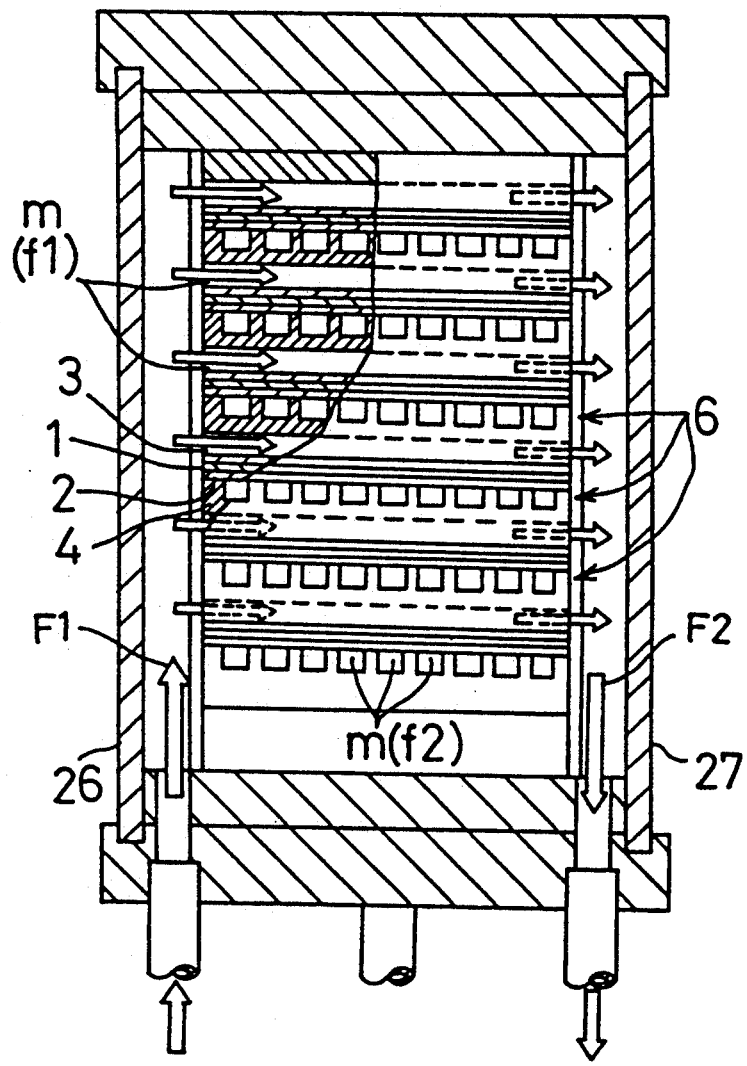
FIG. 19 is a section view showing a conventional fuel cell construction.
Figure 20:
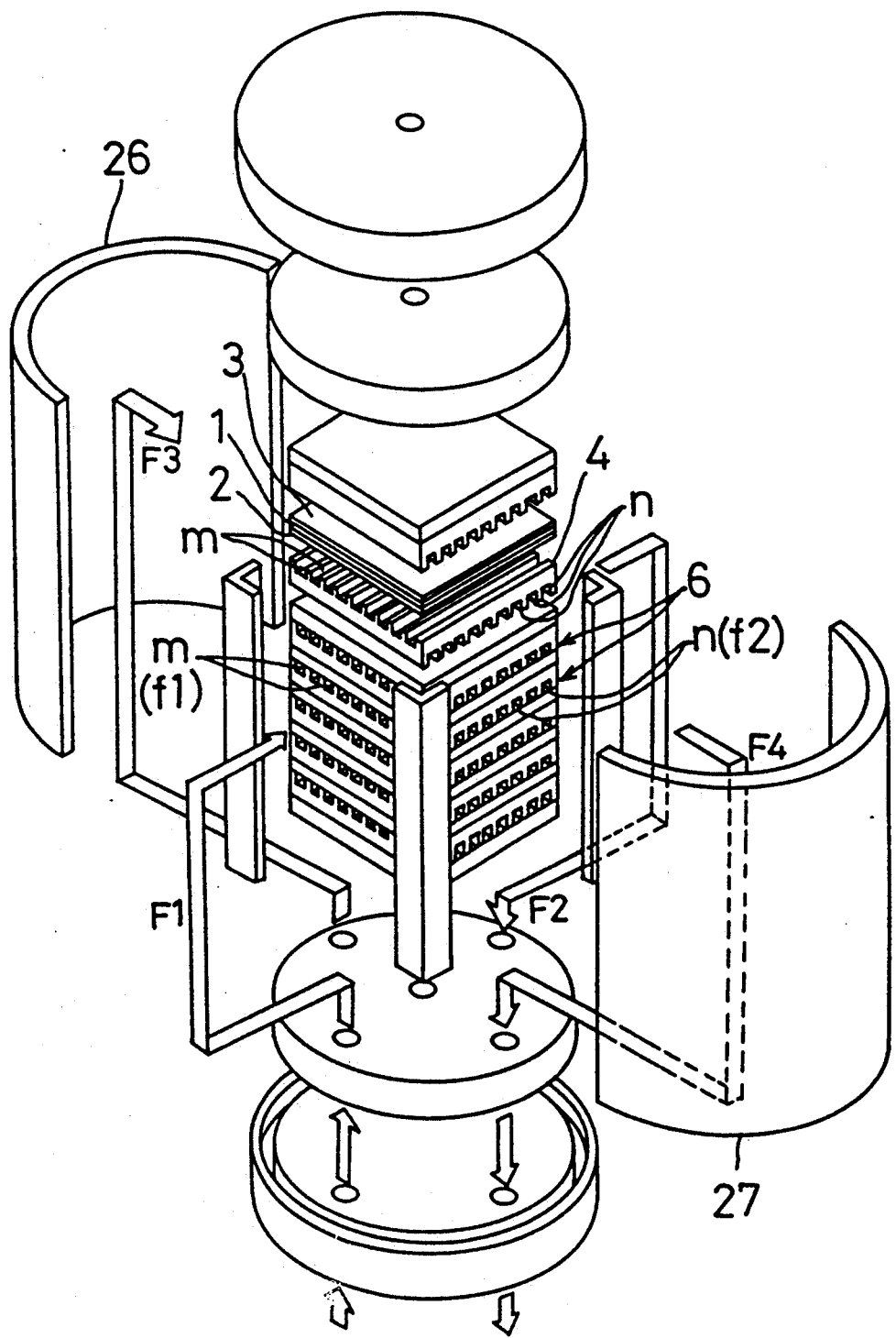
FIG. 20 is an exploded perspective view of the fuel cell construction of FIG. 19.
Figure 21:
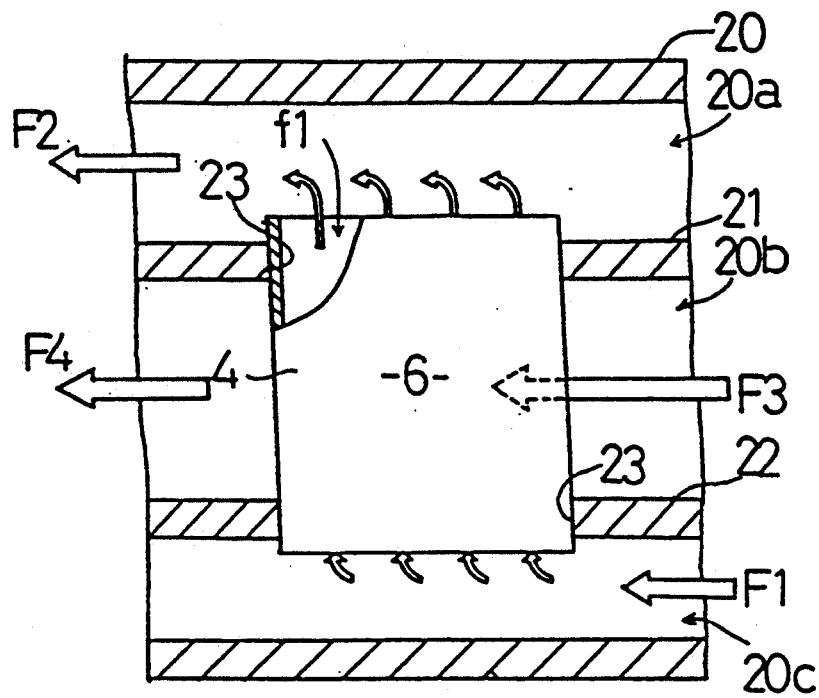
FIG. 21 is an upper section view for comparison.
Figure 22:
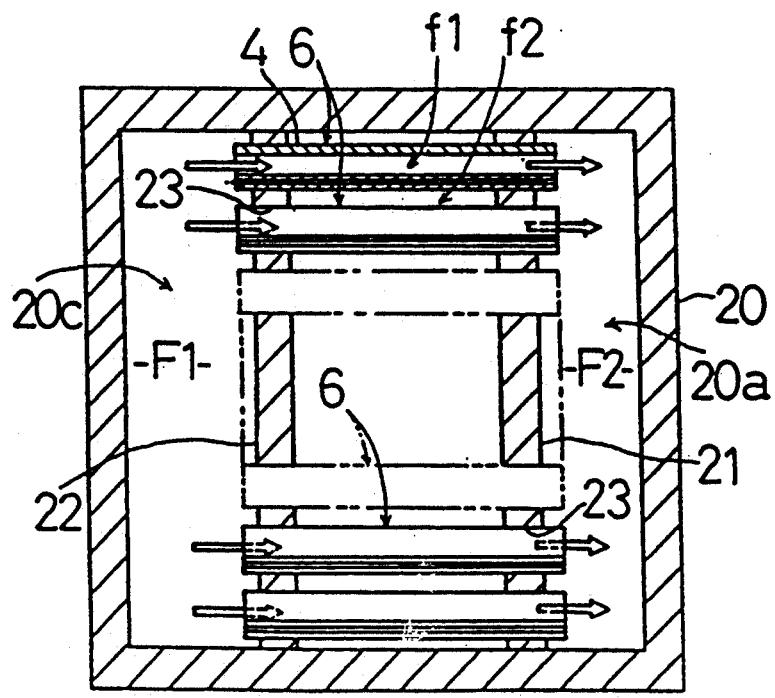
FIG. 22 is a section view of FIG. 21.
Figure 23:
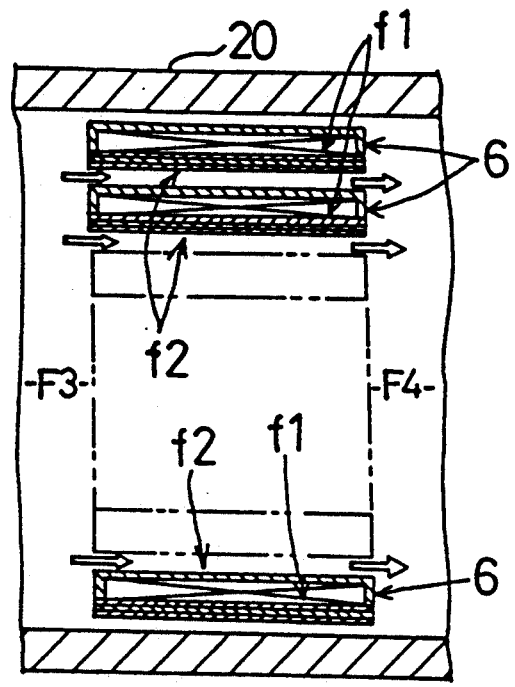
FIG. 23 is a vertical section of the construction of FIG. 21.
Figure 24:
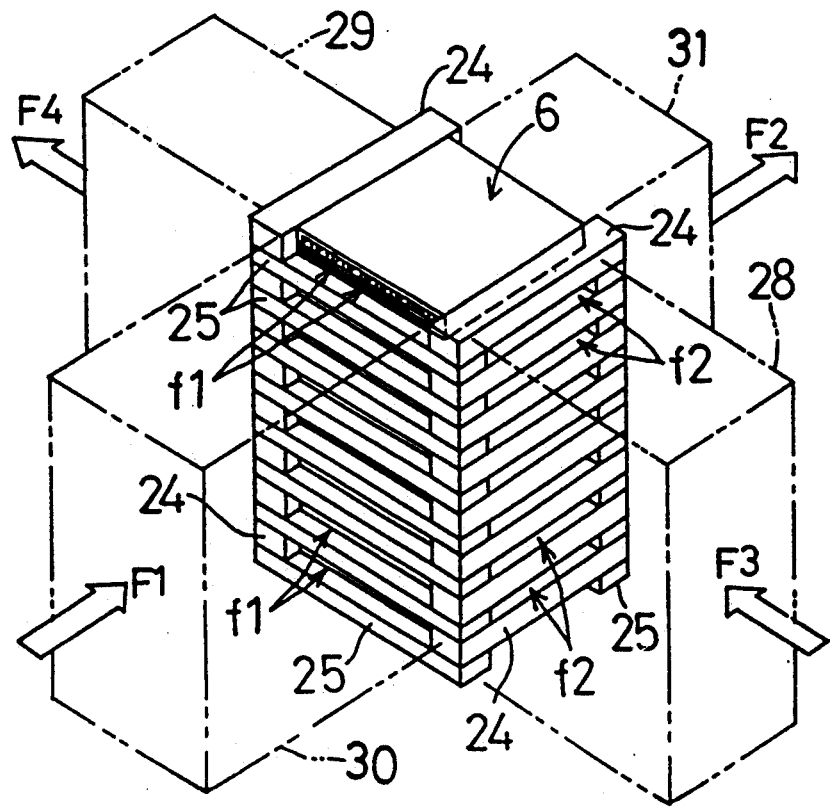
FIG. 24 is a perspective view showing a further conventional fuel cell construction.
Figure 25:
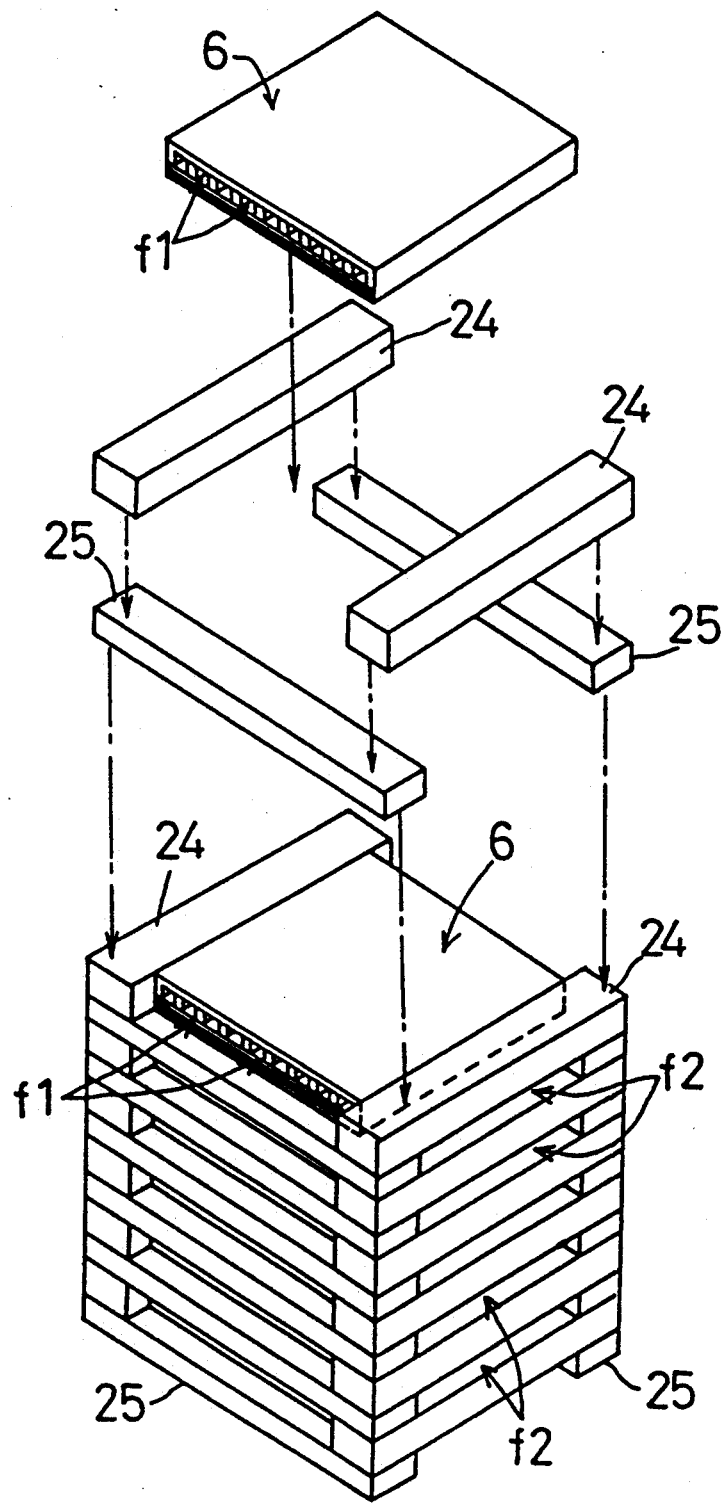
FIG. 25 is an exploded perspective view of the conventional fuel cell construction of FIG. 24.

A still further alternate construction is conceivable by combining the construction of FIGS. 8 through 12 with the further construction of FIGS. 13 through 15. This alternate construction is shown in FIGS. 16 through 18. In this case, the first plate member 9 defines a plurality of cell-insertion openings 11 for housing a plurality of cells with the intra-cell flow passages f1 of these cells being serially communicated with each other. On the other hand, the second plate member 10 defines a plurality of inter-cell flow passage forming openings 14 each having the inter-cell flow passage forming portion 14a common to the corresponding cell 6 housed at one of the cell-insertion openings 11 of the first plate member 9.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A fuel cell comprising:
    a plurality of plate-like cells arranged side by side in a direction of thickness of the cell to provide inter-cell flow passages between adjacently disposed cells, each said cell including,
    a three-layer plate assembly having a solid electrolyte layer, an oxygen electrode affixed to one side of the electrolyte layer and a fuel electrode affixed to the other side of the electrolyte layer, and
    a separator attached to said three-layer assembly in such a manner as to provide an intra-cell flow passage in cooperation with one of said oxygen electrode and said fuel electrode;
    a first plate member having a thickness substantially corresponding to a thickness of said cell;
    a second plate member to be laid on said first plate member in an alternating stacking relationship relative thereto;
    said first plate member forming a cell-insertion opening including a cell housing portion for housing the cell and first and second spaces for respectively communicating with opposed open ends of said intra-cell flow passage of the cell with the cell being housed at said cell housing portion, said first plate member further forming a first communication opening and a second communication opening;
    said second plate member forming an inter-cell flow passage forming opening including an inter-cell flow passage forming portion facing said cell when said cell is housed at said first plate member, a third space communicating with said first communication opening at one terminal end of said inter-cell flow passage forming portion and a fourth space communicating with said second communication opening at the other terminal end of said inter-cell flow passage forming portion, said second plate member further forming a third communication opening communicating with said first space and a fourth communication opening communicating with said second space;
    said inter-cell flow passage being formed between said respective adjacent cells by said inter-cell flow passage forming portions as said first plate member housing said cell and said second plate member are laid one on another;
    said first communication opening in cooperation with said third space and said second communication opening in cooperation with said fourth space forming continuous flow passages which provide an air feed passage and an air exhaust passage for said inter-cell flow passage respectively; and
    said first space in cooperation with said third communication opening and said second space in cooperation with said fourth communication opening forming further continuous flow passages which provide an air feed passage and an air exhaust passage for said intra-cell flow passage respectively.

2. A fuel cell as defined in claim 1, wherein said solid electrolyte layer is formed of $ZrO_2$ obtained as a solid-solution with approximately 3 mol % $Y_2O_3$.

3. A fuel cell as defined in claim 1, wherein said oxygen electrode is formed of $LaMnO_3$.

4. A fuel cell as defined in claim 1, wherein said fuel electrode is formed of a cermet of Ni and $ZrO_2$.

5. A fuel cell as defined in claim 1, wherein said first plate member defines a plurality of cell-insertion openings arranged in parallel with each other while said second plate member defines a single inter-cell flow passage forming opening having an inter-cell flow passage forming portion corresponding and common to a cell-housing portion of one of the plurality of cell-insertion openings defined in said first plate member.

6. A fuel cell as defined in claim 5, wherein said solid electrolyte layer is formed of $ZrO_2$ obtained as a solid-solution with approximately 3 mol % $Y_2O_3$.

7. A fuel cell as defined in claim 5, wherein said oxygen electrode is formed of $LaMnO_3$.

8. A fuel cell as defined in claim 5, wherein said fuel electrode is formed of a cermet of Ni and $ZrO_2$.

9. A fuel cell as defined in claim 1, wherein said first plate member defines a cell-insertion opening for housing a plurality of said cells with the intra-cell flow passages of said cells being serially communicated with each other while said second plate member defines a plurality of inter-cell flow passage forming openings each corresponding to one of the plurality of the cells housed in the first plate member.

10. A fuel cell as defined in claim 9, wherein said solid electrolyte layer is formed of $ZrO_2$ obtained as a solid-solution with approximately 3 mol % $Y_2O_3$.

11. A fuel cell as defined in claim 9, wherein said oxygen electrode is formed of $LaMnO_3$.

12. A fuel cell as defined in claim 9, wherein said fuel electrode is formed of a cermet of Ni and $ZrO_2$.

13. A fuel cell as defined in claim 1, wherein said first plate member defines a plurality of cell-insertion openings for housing a plurality of cells with the intra-cell flow passages of these cells being serially communicated with each other while said second plate member defines a plurality of inter-cell flow passage forming openings each having the inter-cell flow passage forming portion common to the corresponding cell housed at one of the cell-insertion openings of said first plate member.

14. A fuel cell as defined in claim 13, wherein said solid electrolyte layer is formed of $ZnO_2$ obtained as a solid-solution with approximately 3 mol % $Y_2O_3$.

15. A fuel cell as defined in claim 13, wherein said oxygen electrode is formed of $LaMnO_3$.

16. A fuel cell as defined in claim 13, wherein said fuel electrode is formed of a cermet of Ni and $ZrO_2$.

* * * * *